United States Patent [19]

Schreyer et al.

[11] 4,313,424
[45] Feb. 2, 1982

[54] SOLAR HEATING SYSTEM

[75] Inventors: James M. Schreyer, Oak Ridge; George F. Dorsey, Concord, both of Tenn.

[73] Assignee: The United States of America as represented by the United States Department of Energy, Washington, D.C.

[21] Appl. No.: 150,394

[22] Filed: May 16, 1980

[51] Int. Cl.³ .............................................. F24J 3/02
[52] U.S. Cl. .................................. 126/433; 126/435; 126/436; 126/400
[58] Field of Search .............. 126/436, 437, 430, 434, 126/400, 435; 165/104 M, 104 S

[56] References Cited

U.S. PATENT DOCUMENTS 4,114,600  9/1978  Newton ............................. 126/400
4,119,143  10/1978  Robinson, Jr. ...................... 126/400
4,187,982  2/1980  Laing ................................. 126/400

Primary Examiner—James C. Yeung
Attorney, Agent, or Firm—Stephen D. Hamel; Richard G. Besha; James E. Denny

[57] ABSTRACT

An improved solar heating system in which the incident radiation of the sun is absorbed on collector panels, transferred to a storage unit and then distributed as heat for a building and the like. The improvement is obtained by utilizing a storage unit comprising separate compartments containing an array of materials having different melting points ranging from 75° to 180° F. The materials in the storage system are melted in accordance with the amount of heat absorbed from the sun and then transferred to the storage system. An efficient low volume storage system is provided by utilizing the latent heat of fusion of the materials as they change states in storing and releasing heat for distribution.

5 Claims, 2 Drawing Figures

SOLAR HEATING SYSTEM

BACKGROUND OF THE INVENTION

The present invention relates generally to an improved solar heating system of the type in which incident solar radiation is absorbed on collector panels, transferred to a storage system, and then distributed as heat for a building, and more particularly it relates to an improved storage unit for solar heating systems. It was conceived or first reduced to practice in the course of or under a contract with the U.S. Department of Energy.

The utilization of solar energy for heating domestic and commercial buildings has been hindered considerably by the limitations of the storage systems available for collected solar energy. A storage system capable of releasing heat in a manner similar to a stove or fireplace at night and on cold, cloudy days would be highly desirable, thus encouraging increased use of solar energy.

In the prior art, solar energy in the form of heat has been stored in systems utilizing water and rocks separately and in combination, and in materials with low-temperature heats of fusion. In general, storage systems using rocks and/or water for storing the heat produced by solar energy are bulky and require large volumes of storing medium per unit of recoverable energy. Also, capital costs and maintenance for these storage systems are high. For example, rock-bed storage systems require constant care to maintain a sufficient dry environment to prevent microbe formation on the rock. Water-storage systems develop algea which is difficult to control. Storage systems of these types have seriously impaired the utilization of solar energy in the United States because of the problems associated with their use.

It is a general object of the present invention to provide a storage system for solar energy capable of supplying heat for domestic and commercial buildings.

A more particular object of the present invention is to provide a storage system for solar energy with a large heat storage capacity per unit volume.

Other objects, advantages and novel features of the invention will become apparent to those skilled in the art upon examination of the following detailed description of a preferred embodiment of the invention and the accompanying drawings.

SUMMARY OF THE INVENTION

This invention relates to an improved solar heating system in which the incident radiation of the sun is absorbed on collector panels, transferred to a storage unit and then distributed as heat to a building. The improvement is obtained by utilizing a storage unit comprising a plurality of separate insulated compartments containing materials having different melting points ranging from 75° to 180° F. The materials in the storage unit are melted in accordance with the amount of heat absorbed from the sun. An efficient low volume storage unit is provided by utilizing the latent heat of fusion of the materials as they change states in storing and releasing heat for distribution.

DESCRIPTION OF THE PREFERRED EMBODIMENT

Figure 1:
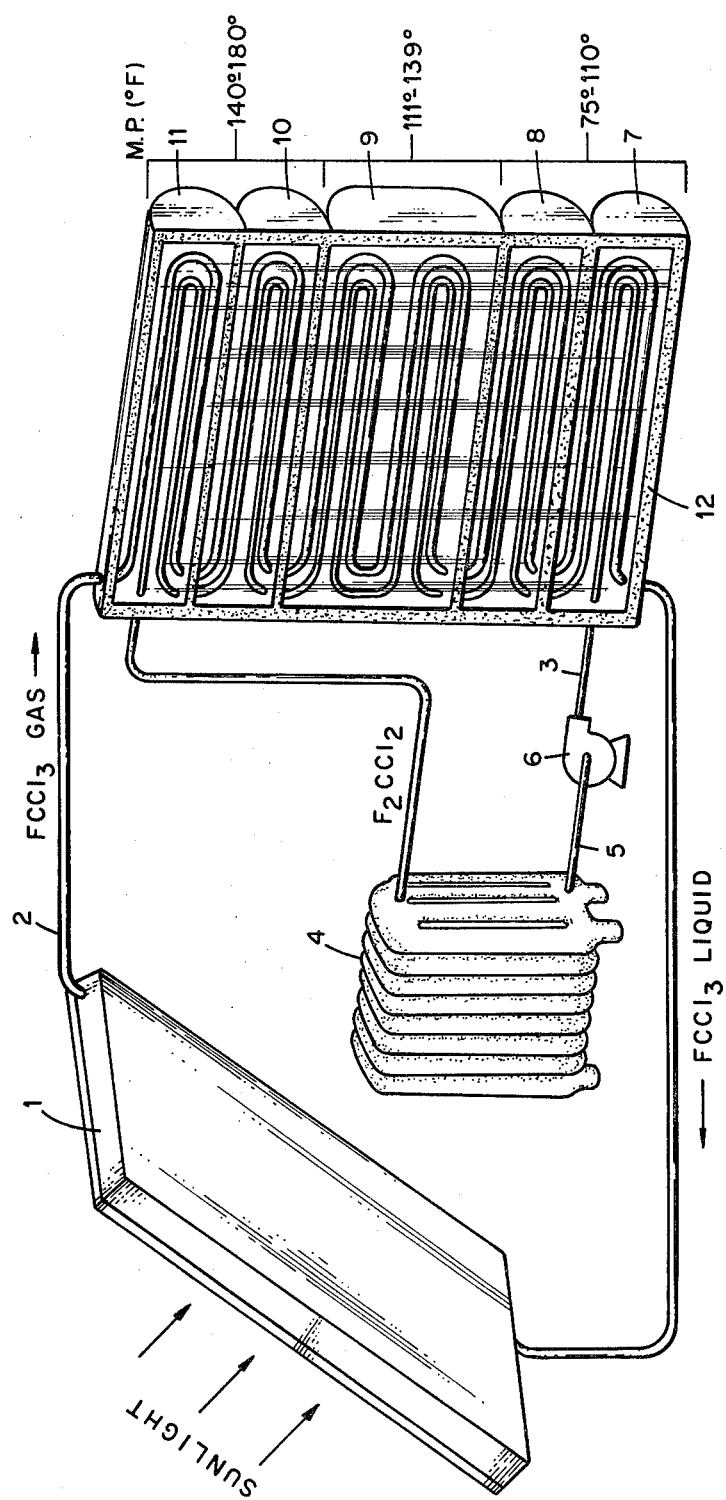
FIG. 1 is a schematic drawing of a preferred embodiment of the improved solar heating system of the present invention.

Referring to FIG. 1, a solar collector panel 1, for example as described in U.S. Pat. No. 4,026,272, is utilized for absorbing incident radiation from the sun. The heat generated by the absorbed radiation is transferred from the panel into a refrigerant, fluorotrichloromethane ($FCCl_3$) for example, which is circulated by means of a tubing 2 through passages in the solar collector panel. Heat is carried by the refrigerant in the tube 2 to and through a solar storage unit consisting of a plurality of compartments 7, 8, 9, 10, and 11, insulated each from the others by the insulation 12, and then back to the solar collector panel 1. The compartments 7–11 contain an array of respective materials having different melting points. The following table illustrates a list of materials that are suitable for use in the storage unit.

| Material | Melting Point °F. | Melting Point °C. | Approx. Density gm/cc | Heat of Fusion Cal/gm | Heat of Fusion Cal/cc |
|---|---|---|---|---|---|
| p-chlorobenzene-naphthalene | 86 | 30 | 1.30 | 30.0 | 39.0 |
| myristyl alcohol | 100 | 38 | 0.85 | 58.7 | 46.4 |
| lauric acid | 110 | 43 | 0.83 | 43.7 | 36.4 |
| cetyl alcohol | 120 | 49 | 0.82 | 33.8 | 27.6 |
| tristearin | 138 | 56 | 0.94 | 45.6 | 43.0 |
| stearic acid | 147 | 64 | 0.84 | 47.6 | 39.9 |
| p-chloroaniline | 156 | 69 | 1.20 | 37.9 | 54.0 |
| naphthalene | 176 | 80 | 1.15 | 35.6 | 41.4 |

The stored heat is transferred from the storage unit 11 to a suitable heat exchanger such as radiator 4 by means of a heat exchange medium ($F_2CCl_2$, for example, or a higher boiling point liquid such as water, oil, silicone oil or any liquid which can be pumped) which is circulated by means of a pump 6 and any suitable conduit such as tube 3 passing through the respective compartments 7–11 of the storage unit. The heat exchange medium is then passed by means of a suitable conduit 5 back to the pump 6. It is noted that the flow of the heat exchange medium in conduit 3 passes through the compartments 7–11 in reverse direction relative to the flow of the refrigerant in the tube 2 passing through the same compartments.

Previous experiments have indicated that a solar collector panel as described in the above-identified patent will absorb an average of 200 Btu/hr/ft² over a period of time from 10 a.m. to 4 p.m. at a latitude of 36°. A panel having 40-square feet of collector surface would thus produce about 48,000 Btu per day which is equivalent to the energy of one-half gallon of oil.

Lauric acid may be selected as a representative material for calculating the approximate amount of materials needed for a 48,000 Btu storage unit. The following calculations are based on the use of lauric acid:

$$.833 \text{ g/cc} \times 62.428 \frac{\text{lb-cc}}{\text{g-ft}^3} = 52 \text{ lb/ft}^3$$

$$43.7 \text{ Cal/g} \times 1.8 \frac{\text{Btu-g}}{\text{Cal-lb}} = 78.7 \text{ Btu/lb}$$

$$78.7 \text{ Btu/lb} \times 52 \text{ lb/ft}^3 = 4092 \text{ Btu/ft}^3$$

-continued
48,000 Btu/day ÷ 4092 Btu/ft$^3$ = 11.7 ft$^3$ (600 lb)

These calculations indicate that approximately 12 ft$^3$ or 600 lbs of lauric acid would be required for storing the 48,000 Btu supplied daily by a 40-square foot panel of solar collectors. It is noted that the calculations do not include the heat absorbed and stored by the heat capacity of lauric acid below and above the melting point of the compound but are based on the heat of fusion of that material only. Consequently, 12 cubic feet of 600 lbs of storage material should be more than adequate for absorbing and storing 48,000 Btu. It is also noted, however, that each of the respective storage compartments 7-11 of FIG. 1 contains a different material selected from the list of materials in the above table such that the total volume of the respective materials stored in the compartments 7-11 is sufficient to provide storage capacity for 48,000 Btu. Calculations of the kind made above are made for each of the respective materials to arrive at the overall storage capacity of the unit.

Inherent in the solar heating system of the present invention is the utilization of the latent heat of fusion of the materials in the storage unit. Materials having successively higher melting points are needed because the temperatures generated within the solar collector vary. For example, temperatures in the collectors may be as low as 75° F. on cloudy winter days and as high as 180° F. on sunny days. As indicated above, the storage unit contains an array of materials having respective different melting points ranging from 75° to 180° F. to accommodate different climatic and atmospheric conditions. The array of materials could be completely melting on bright sunny days. However, only one or two of the materials would be melted on cloudy days depending on solar conditions. At night, or when heat is needed in a building, the melting materials in the storage unit can be utilized by transferring their heat of fusion into the building by means of the components 3, 4, 5, and 6 of FIG. 1 as discussed above. After the materials become solidified during the night or when used to provide heat on cold mornings or evenings, they are then remelted using heat collected the next day to complete the cycle. An array of materials could be selected, if desired, to cover higher temperatures, up to 400° F., which can be produced when concentrating collectors are utilized.

Figure 2:
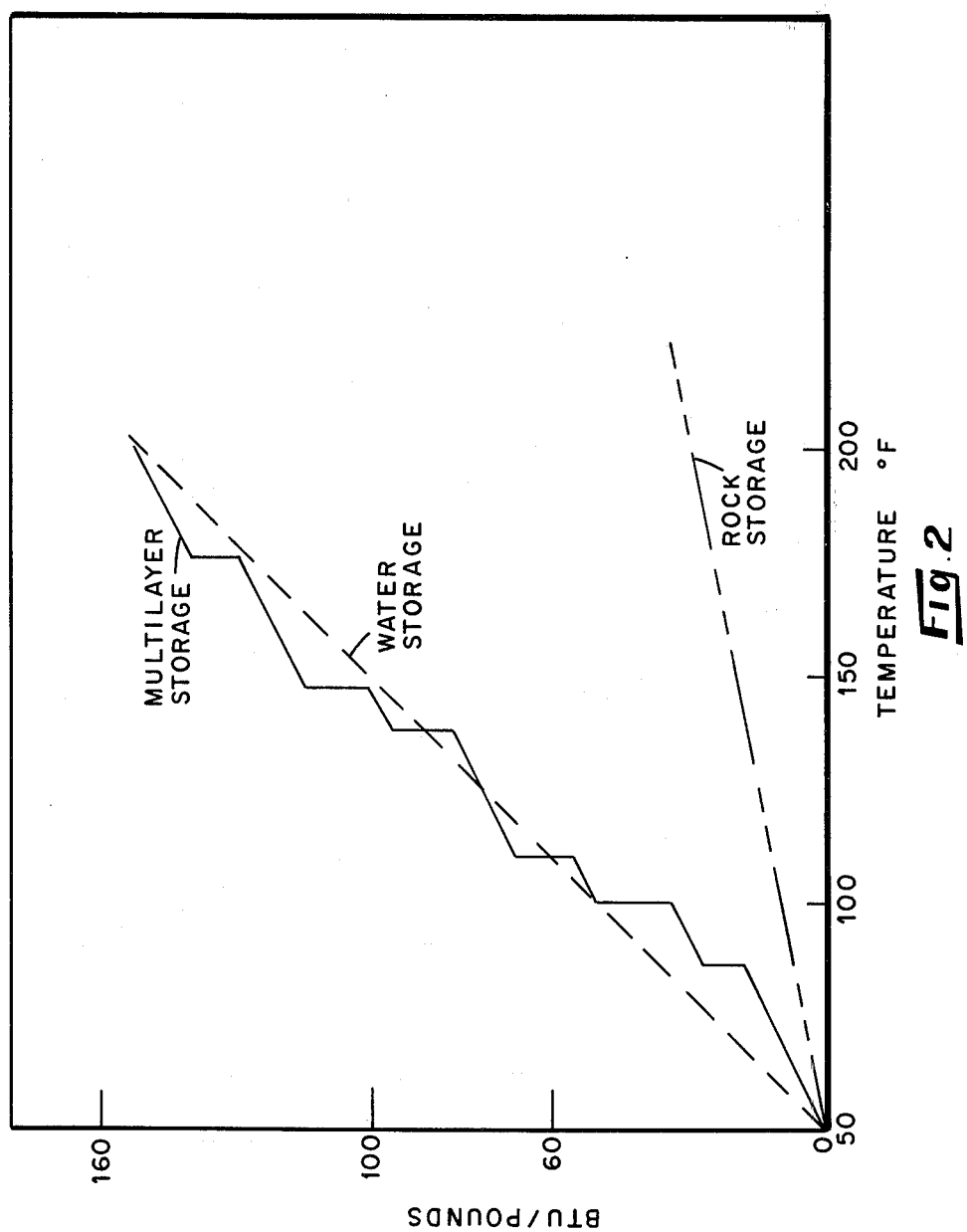
FIG. 2 is a graph comparing the storage unit of the invention with storage systems of water and rocks.

The capability of the present heat storage system with a multilayer array of compounds exceeds the capability of water and rock storage systems in function and capacity. Thus, in the present system energy is released in the form of heat, in steps, beginning with the compound having the highest melting point and proceeding to the compound having the lowest melting point. The compound with the highest melting point would provide heat for a rapid increase in the temperature of an area while the compounds with the lower melting points would provide heat for maintaining a comfortable temperature in the area. Heat distribution of this type is similar to the heat distribution of a thermostatically controlled heater or fireplace. FIG. 2 compares the present storage system with the conventional water and/or rock system based on Btu per pound versus temperature. As shown, the multilayer storage unit compares favorably with water in a Btu per pound basis over a temperature range extending from 50° F. to more than 200° F. The steplike profile of the multilayer storage plot is due to the different melting points of the different materials used according to the invention. Rock storage is seen to be substantially poorer on a Btu per pound basis with rocks weighing more than four times that of the water system or multilayer storage unit being required for equivalent Btu retention.

The advantages of the present system cannot be realized with a single compound for storing energy. For example, if only a low melting point compound were used for storing heat, the temperature of the heat transfer agent would be low and a relatively long period of time would be required for attaining a comfortable temperature in an area. If only a high melting point compound were used for storing heat, the heat transfer agent would return to the collectors at a relatively high temperature which would reduce the efficiency of the system. Also, the efficiency of the system would be lessened by the high melting point compound on cloudy days and cool periods of time in the morning and late afternoon when collector temperatures are too low to melt high melting point compounds. Thus, an array of compounds is needed for conditions where high heat transfer is needed and for achieving maximum efficiency, wherein the vaporization and condensation of the refrigerant in transferring heat from the collectors to storage and distribution will provide a major portion of the energy required for heat transport by convective circulation.

The system described above can be utilized for purposes other than that of heating buildings. For example, it can be utilized for domestic hot water heating, for heating swimming pools and for heating home and commercial hot houses, particularly during the night for protecting plants, even in the summer months where the ambient night temperature drops below a desired level in such locations as in some of our northern states.

The foregoing description of a preferred embodiment of the invention has been presented for purposes of illustration and description 5 and is not intended to be exhaustive or to limit the invention to the precise embodiment disclosed. It was chosen and described in order to best explain the principles of the invention and their practical application to thereby enable those skilled in the art to best utilize the invention in various embodiments as are suited to the particular use contemplated. It is intended, rather, that the scope of the invention be defined by the claims appended hereto.

What is claimed is:

1. In combination,
   solar-collector means for supplying heated vaporized refrigerant at a range of temperatures, said range reflecting variations in the climatic and atmospheric conditions to which said panel is exposed,
   a heat-storage device including a generally vertical array of insulated compartments respectively containing heat-storage materials having different melting points which collectively (a) span said range and (b) define a decreasing stepwise gradient from the top compartment to the bottom compartment,
   natural-convection loop means for conveying heated refrigerant from said panel downwardly through said array for condensation therein, and for returning liquid refrigerant to said panel,
   a heat exchanger for heating an enclosure, and
   means for circulating a heat-exchange fluid through said array of compartments countercurrently to said refrigerant and through said heat exchanger.

2. The improvement of claim 1 wherein the melting points of said respective heat storage materials range from 75° F. to 180° F.

3. The improvement of claim 1 wherein the refrigerant contained in said first conduit means is $FCCl_3$ and the heat exchange medium in said second conduit means is a pumpable liquid.

4. The improvement of claim 1 wherein said pumpable liquid is selected from the group consisting of $F_2CCl_2$, water and oil.

5. In combination,
solar-collector means for supplying vaporized refrigerant whose temperature varies over a range of values, said range reflecting changes in the climatic and atmospheric conditions to which said panel is exposed during a heating season,
a heat-storage device including at least five generally vertical insulated compartments respectively containing heat-storage materials having different melting points which collectively (a) span said range and (b) define a decreasing stepwise gradient from the top compartment to the bottom compartment,
natural-convection loop means for conveying heated refrigerant from said panel downwardly through said compartments for condensation therein, and for returning liquid refrigerant to said panel,
a heat exchanger for heating an enclosure, and
loop means including a pump for circulating heat-exchange liquid through said compartments countercurrently to said refrigerant, through said heat exchanger, and back to said compartments.

* * * * *